United States Patent
Alissa et al.

(10) Patent No.: US 11,680,201 B1
(45) Date of Patent: Jun. 20, 2023

(54) SYSTEMS AND METHODS IN WHICH COLLOIDAL SILICA GEL IS USED TO SEAL A LEAK IN OR NEAR A PACKER DISPOSED IN A TUBING-CASING ANNULUS

(71) Applicant: Saudi Arabian Oil Company, Dhahran (SA)

(72) Inventors: Faisal Alissa, Dammam (SA); Abdulrahman Ghazal, Dhahran (SA); Haitham Aljuaydi, Riyadh (SA); Abdullah Alzahrani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/710,011

(22) Filed: Mar. 31, 2022

(51) Int. Cl.
*E21B 33/138* (2006.01)
*C09K 8/504* (2006.01)
(Continued)

(52) U.S. Cl.
CPC ............ *C09K 8/5045* (2013.01); *C09K 8/516* (2013.01); *E21B 23/06* (2013.01); *E21B 33/1208* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 3,654,993 | A | 4/1972 | Smith et al. |
| 4,664,193 | A | 5/1987 | Wu |

(Continued)

FOREIGN PATENT DOCUMENTS

| | | |
|---|---|---|
| WO | 2004061046 | 7/2004 |
| WO | 2009059798 | 5/2009 |

(Continued)

OTHER PUBLICATIONS

U.S. Appl. No. 17/709,819, filed Mar. 31, 2022, Alissa et al.
(Continued)

*Primary Examiner* — Andrew Sue-Ako
(74) *Attorney, Agent, or Firm* — Fish & Richardson P.C.

(57) ABSTRACT

A system includes a casing, a tubing within the casing, a packer, and a colloidal silica gel. The casing inner surface and the tubing outer surface define an annular space, and the packer is within the annular space. The colloidal silica gel which seals a gap. The gap can be a gap between the inner surface of the casing and a surface of the packer, a gap between the outer surface of the tubing and a surface of the packer, and/or a gap extending through the packer. A well can include such a system. A method of sealing a leak in or near a packer present in an annular space between a production casing inner surface and a tubing outer surface includes disposing a composition within the annular space, the composition comprising colloidal silica, water, and an activator. The method also includes allowing colloidal silica to precipitate from the composition to provide a colloidal silica gel within the annular space, wherein the colloidal silica seals a gap that can be a gap between the inner surface of the production casing and a surface of the packer, a gap between the outer surface of the tubing and a surface of the packer, and/or a gap extending through the packer.

20 Claims, 8 Drawing Sheets

(51) Int. Cl.
*E21B 23/06* (2006.01)
*C09K 8/516* (2006.01)
*E21B 33/12* (2006.01)

(56) References Cited

U.S. PATENT DOCUMENTS

| | | | |
|---|---|---|---|
| 4,732,213 A * | 3/1988 | Bennett | C09K 8/50 |
| | | | 166/275 |
| 4,745,139 A | 5/1988 | Hassl et al. | |
| 5,623,993 A | 4/1997 | Van Buskirk et al. | |
| 6,121,336 A | 9/2000 | Okoroafor et al. | |
| 7,732,016 B2 | 6/2010 | Van Ooij et al. | |
| 8,900,670 B2 | 12/2014 | Singh et al. | |
| 9,199,879 B2 | 12/2015 | Thaemlitz et al. | |
| 10,641,074 B1 * | 5/2020 | Alabdulmuhsin | E21B 43/261 |
| 2004/0033905 A1 | 2/2004 | Shinbach et al. | |
| 2006/0134339 A1 | 6/2006 | Wang et al. | |
| 2012/0298359 A1 * | 11/2012 | Eden | E21B 33/1204 |
| | | | 166/57 |
| 2014/0060831 A1 * | 3/2014 | Miller | E21B 43/267 |
| | | | 166/280.1 |
| 2017/0321516 A1 * | 11/2017 | Barton | E21B 33/1285 |
| 2017/0349763 A1 | 12/2017 | Wu et al. | |
| 2018/0142529 A1 * | 5/2018 | MacDonald | E21B 33/128 |
| 2018/0208826 A1 | 7/2018 | Bourcier et al. | |
| 2018/0362827 A1 * | 12/2018 | Bataweel | E21B 33/138 |
| 2021/0079286 A1 * | 3/2021 | Escobar | C04B 26/28 |

FOREIGN PATENT DOCUMENTS

| | | |
|---|---|---|
| WO | 2014190226 | 11/2014 |
| WO | 2015103096 | 7/2015 |
| WO | 2018091986 | 5/2018 |

OTHER PUBLICATIONS

U.S. Appl. No. 17/710,021, filed Mar. 31, 2022, Alissa et al.
Ahmad et al., "Hydrophobicity—a green technique for enhancing corrosion resistance of alloys." New Trends in Alloy Development, Characterization and Application, Sep. 2015, 43 pages.
Drdlová et al., "Effect of nanoparticle modification on static and dynamic behaviour of foam based blast energy absorbers." Cellular Polymers 35.3, May 2016, 143-158, 16 pages.
Gurav et al., "Silica aerogel: synthesis and applications." Journal of Nanomaterials, Jan. 2010, 11 pages.
Hillesheim et al., "Effects of Surface Modification Conditions on Hydrophobicity of Silica-based Coating Additives." CORROSION 2013. OnePetro, Mar. 2013, 11 pages.
Hunt et al., "Kinetics of the gelation of colloidal silica at geothermal conditions, and implications for reservoir modification and management" No. LLNL-CONF-614952. Lawrence Livermore National Lab.(LLNL), Livermore, CA (United States), Jan. 2013, 12 pages.
Jiantao, L., & Bingzheng, H. (2013). Development of Silica Aerogel and Hollow Glass Microspheres Based Heat-Insulating Coatings [J], Paint & Coatings Industry, 7., 2013, 2 pages (Abstract Only).
Keivani et al., "Synergistic toughening in ternary silica/hollow glass spheres/epoxy nanocomposites." Polymer-Plastics Technology and Engineering 54.6, Apr. 2015, 581-593, 14 pages.
Lesbayev et al., "Hydrophobic sand on the basis of superhydrophobic soot synthesized in the flame." Journal of Materials Science and Chemical Engineering 2.1, Jan. 2014, 63-65, 3 pages.
Magryta, "Wplyw aerożelu na właściwości wulkanizatów kauczuku butadienowo-akrylonitrylowego (NBR)," Polimeiy 57.2, Feb. 2012, 117-123, 7 pages.
Maleki et al., "An overview on silica aerogels synthesis and different mechanical reinforcing strategies." Journal of Non-Crystalline Solids 385, Feb. 2014, 55-74, 20 pages.
Rotaru et al., "Performances of clay aerogel polymer composites for oil spill sorption: Experimental design and modeling." Separation and Purification Technology 133, Sep. 2014, 260-275, 16 pages.
Shi et al., "Superhydrophobic silica aerogels reinforced with polyacrylonitrile fibers for adsorbing oil from water and oil mixtures." RSC advances 7.7, 2017, 4039-4045, 7 pages.
Vu et al., "Evaluation of the corrosion inhibiting capacity of silica/polypyrrole-oxalate nanocomposite in epoxy coatings." International Journal of Corrosion, Jan. 2018, 11 pages.
Zhao et al., "Chemical solution to ESP packer penetrator corrosion problem." International Petroleum Technology Conference. OnePetro, Jan. 2020, 7 pages.
Zhao et al., "Development of low density rigid gels/composites for ESP packer penetrator protection." SPE Kingdom of Saudi Arabia Annual Technical Symposium and Exhibition. OnePetro, Apr. 2018, 10 pages.
Zuo et al., "Polymer/carbon-based hybrid aerogels: preparation, properties and applications" Materials, 8(10), Oct. 2015, 6806-6848., 43 pages.

* cited by examiner

SYSTEMS AND METHODS IN WHICH COLLOIDAL SILICA GEL IS USED TO SEAL A LEAK IN OR NEAR A PACKER DISPOSED IN A TUBING-CASING ANNULUS

FIELD

The disclosure generally relates to systems and methods in which colloidal silica gel is used to seal a leak in or near a packer disposed between a casing inner surface and a tubing outer surface.

BACKGROUND

Figure 1:
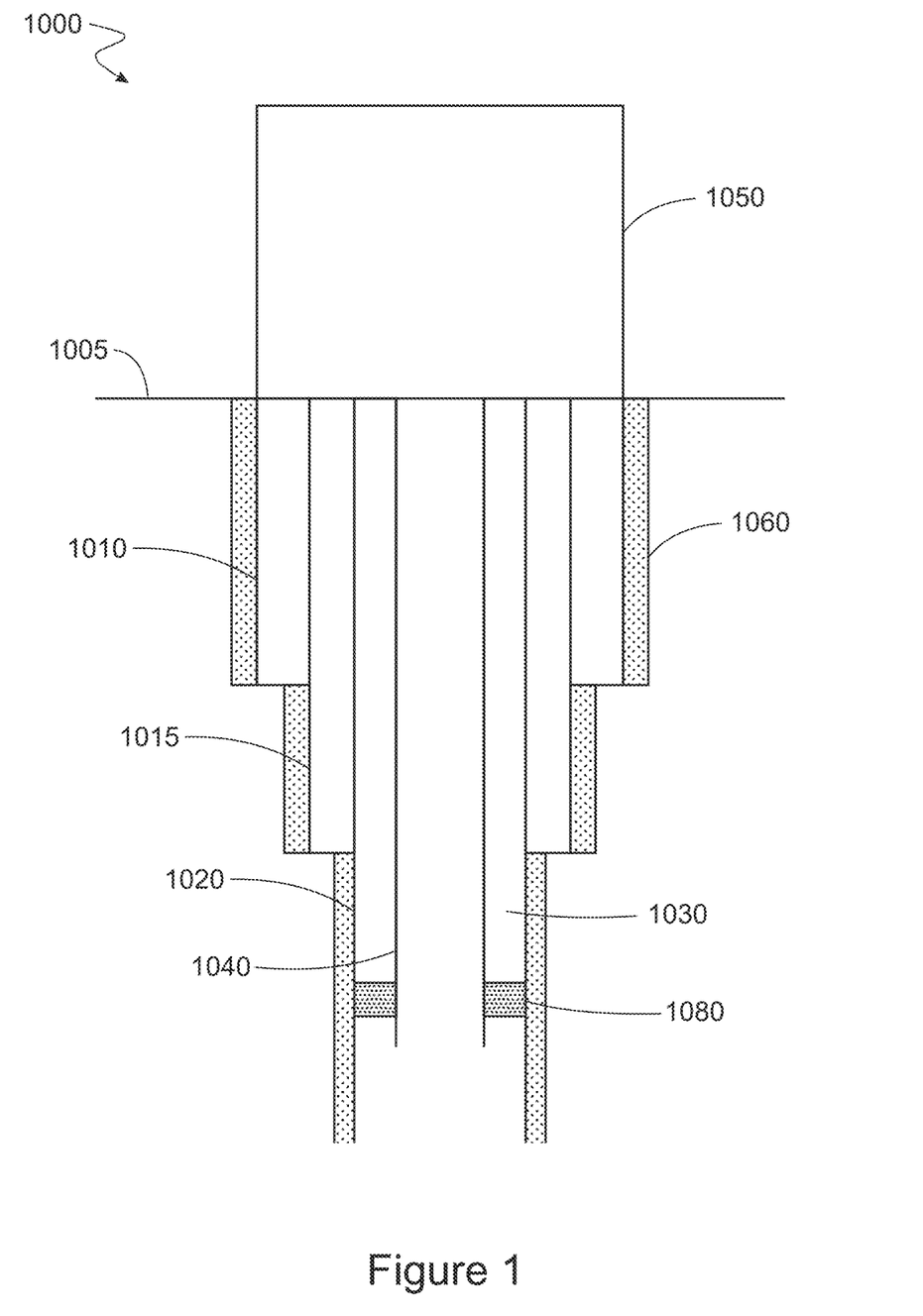
FIG. 1 is a schematic illustration of a system.

FIG. 1 schematically depicts a system 1000, which is part of a well, such as an oil well, a gas well or a water well. The system 1000 includes several casings, shown in FIG. 1 as elements 1010, 1015, 1020, although more casings may be present. The casings 1010, 1015 and 1020 extend into a borehole 1060 which is located below the earth's surface 1005. The casings 1010, 1015 and 1020 may be cemented in place. The system 1000 also includes an aboveground portion of a wellhead 1050. The casings include a surface casing 1010, an intermediate casing 1015 and a production casing 1020. Generally, the casings 1010, 1015 and 1020 maintain the stability of the borehole 1060 and isolate the contents of the well and the different belowground zones from one another. For example, the surface casing 1010 isolates freshwater zones to prevent their contamination. A tubing 1040 is disposed inside the production casing 1020. Generally, the tubing 1040 is the conduit through which a desired fluid produced by the well (e.g., oil or gas) is brought from below the earth's surface 1005 to above the earth's surface 1005. A tubing-casing annulus 1030 is defined as the space between the production casing 1020 and the tubing 1040. A packer 1080 is disposed in the tubing-casing annulus 1060 to force the desired fluid produced by the well (e.g., oil or gas) to flow upward through only the tubing 1040 and to prevent the desired fluid from entering the tubing-casing annulus 1060. A packer fluid can be present in the tubing-casing annulus 1060 above the packer 1080 to maintain the integrity of the production casing 1020 and to prevent well collapse by reducing the pressure differential between the interior of the tubing 1040 and the tubing-casing annulus 1030 and the outside of the casing 1020 and the tubing-casing annulus 1030. The packer fluid may be used to detect leaks in the tubing 1040 and/or the production casing 1020. The packer 1080 prevents the packer fluid from leaking out of the space above the packer 1080 and entering the space below the packer 1080.

SUMMARY

The disclosure generally relates to systems and methods in which colloidal silica gel is used to seal leaks in or near a packer, which is disposed in an annular space between a casing inner surface and a tubing outer surface (herein referred to as a tubing-casing annulus or annulus) in a well. Typically, the casing is the production casing of a well, such as an oil producing well, a gas producing well or a water producing well.

In certain embodiments, the leak is in the form of a gap between the packer and the inner surface of the casing (e.g., the production casing). In some embodiments, the leak is in the form of a gap between the packer and an outer surface of the tubing. In certain embodiments, the leak is in the form of a passageway that allows fluid to flow through the packer itself. In some embodiments, a combination of two or more such leaks may be present.

In some embodiments, the colloidal silica gel completely covers a top surface of the packer in the tubing-casing annulus. In certain embodiments, the colloidal silica gel completely covers the top surface of the packer and extends into the leak (e.g., between the casing inner surface and the packer outer surface, between the tubing outer surface and the packer inner surface, and/or into a passageway that would otherwise allow fluid to flow through the packer itself).

In general, the colloidal silica gel forms by precipitating out of a composition containing colloidal silica, water and an activator. In some embodiments, the composition further includes an oxygen scavenger and/or a corrosion inhibitor. The oxygen scavenger and/or corrosion inhibitor can be employed to reduce (e.g., avoid) corrosion due to water contained in the composition and/or species, such as dissolved oxygen, present in the water.

In general, the composition is disposed into the tubing-casing annulus relatively quickly (e.g., immediately) after preparation. Gel formation due to precipitation can occur shortly (e.g. immediately) after mixing the components of the composition. In certain embodiments, relatively quickly (e.g., immediately) after mixing, the composition is disposed into the tubing-casing annulus. In some embodiments, the timing of the formation of the colloidal silica gel can be controlled by using an appropriate method for disposing the composition in the tubing-casing annulus. As an example, in some embodiments, the composition is pressurized, e.g., using a pump, to dispose the composition in the annulus to attain desired formation of the colloidal silica gel. Without wishing to be bound by theory, it is believed that pressurizing the composition can enhance precipitation of the colloidal silica gel due to bringing the molecules relatively close together. In general, the composition is disposed into the tubing-casing annulus via an opening that is in fluid communication with the tubing-casing annulus. As an example, such an opening can be a flange. In some embodiments, the tubing-casing annulus has a flange, and the composition is disposed within the annulus through the flange, e.g., by pumping the composition through the flange so that it passes down the tubing-casing annulus and forms the colloidal silica gel as desired. For example, a back-side pump can be used to pressurize the composition through the flange and into the tubing-casing annulus.

Over a substantial period of time, little if any undesired fluid (e.g., formation fluid, oil, gas, water, packer fluid) can penetrate the colloidal silica gel used to seal the leak(s) that was(ere) present. In some embodiments, the colloidal silica gel prevents a fluid external to the tubing-casing annulus (e.g. oil, gas, water) from entering the annulus. In some embodiments, the colloidal silica gel can prevent a fluid (e.g., a packer fluid) within the tubing-casing annulus and above the packer from leaking below the packer and potentially out of the tubing-casing annulus. The colloidal silica gel therefore prevents fluids external to the tubing-casing annulus and/or contained within the tubing-casing annulus from following an unintended pathway, i.e., the colloidal silica gel seal maintain proper fluid flow within the system and prevents fluid communication across the packer. In general, the colloidal silica gel is non-corrosive and would not cause corrosion of components it contacts (e.g., the inner surface of the casing, the outer surface of the tubing and/or the packer). The colloidal silica gel would not corrode under corrosive conditions, for example, under acidic conditions.

The colloidal silica gel can provide a relatively inexpensive and easy way to seal leaks in or near a packer. In addition, the colloidal silica gel seal can mitigate safety issues and environmental impacts related to packer-related leaks and/or penetration of one or more undesired fluids into the tubing-casing annulus. As an example, a leak in the packer can enable low-density hydrocarbons to enter the tubing-casing annulus causing an increase in the tubing-casing annulus pressure, which can jeopardize the integrity of the well. As another example, a leak in the packer can cause packer fluid to leak, which can threaten the integrity of the well.

Further, the systems and methods can reduce or eliminate the need for repairing leaks by replacing the packer, which can be costly and difficult. As an example, known methods of repairing a leak by replacing the packer typically involve a workover rig. As a result, the lost use time of the well and/or the cost associated with known methods of repairing a leak by replacing a packer can be substantial. The systems and methods according to the disclosure can reduce such costs and/or lost use time of the well.

In a first aspect, the disclosure provides a system that includes a casing, a tubing within the casing, a packer, and a colloidal silica gel. The casing inner surface and the tubing outer surface define an annular space, and the packer is within the annular space. The colloidal silica gel which seals a gap, which is a gap between the inner surface of the casing and a surface of the packer, a gap between the outer surface of the tubing and a surface of the packer, and/or a gap extending through the packer.

In some embodiments, the casing is a production casing.

In some embodiments, the gap is a gap between the inner surface of the casing and a surface of the packer.

In some embodiments, the colloidal silica gel is on an upper surface of the packer. In certain embodiments, the colloidal silica gel extends at least two feet above the upper surface of the packer.

In some embodiments, the colloidal silica gel prevents a fluid in the annular space from flowing between a region above the packer and a region below the packer.

In some embodiments, the casing, the tubing and the packer are underground components of a well.

In some embodiments, the casing is a production casing, the gap is a gap between the inner surface of the casing and a surface of the packer, and the colloidal silica gel is on an upper surface of the packer.

In some embodiments, the composition includes at least 6.5 wt. % of colloidal silica. In a second aspect, the disclosure provides a well that includes a production casing, a tubing, a packer and a colloidal silica gel. The tubing is within the production casing, and the production casing inner surface and the tubing outer surface define an annular space. The packer is within the annular space. The colloidal silica gel seals a gap, which is a gap between the inner surface of the production casing and a surface of the packer, a gap between the outer surface of the tubing and a surface of the packer, and/or a gap extending through the packer. The well can be, for example, an oil well, a gas well, or a water well.

In some embodiments, the gap is a gap between the inner surface of the casing and a surface of the packer.

In some embodiments, the colloidal silica gel is on an upper surface of the packer. In certain embodiments, the colloidal silica gel extends at least two feet above the upper surface of the packer.

In a third aspect, the disclosure provides a method of sealing a leak in or near a packer present in an annular space between a production casing inner surface and a tubing outer surface. The method includes disposing a composition within the annular space, wherein the composition includes colloidal silica, water, and an activator. The method also includes allowing colloidal silica to precipitate from the composition to provide a colloidal silica gel within the annular space. The colloidal silica seals a gap that is a gap between the inner surface of the production casing and a surface of the packer, a gap between the outer surface of the tubing and a surface of the packer, and/or a gap extending through the packer.

In some embodiments, disposing the composition within the annular space includes pumping the composition into the annular space.

In some embodiments, the colloidal silica gel has a gelation time of at least 4 minutes and at most 20 minutes.

In some embodiments, the colloidal silica gel has density that is greater than a density of water.

In some embodiments, the composition includes: from 66 wt. % to 91.5 wt. % water; from 6.5 wt. % to 32 wt. % colloidal silica; and from 0.2 wt. % to 4 wt. % NaCl.

In some embodiments, the composition includes: from 66 wt. % to 91.5 wt. % water; from 6.5 wt. % to 32 wt. % colloidal silica; and from 2.5 wt. % to 15 wt. % 1,6-hexanediol-diglycidyl-ether.

In some embodiments, the colloidal silica gel occupies a volume of at least one cubic foot.

DETAILED DESCRIPTION

Figure 2:
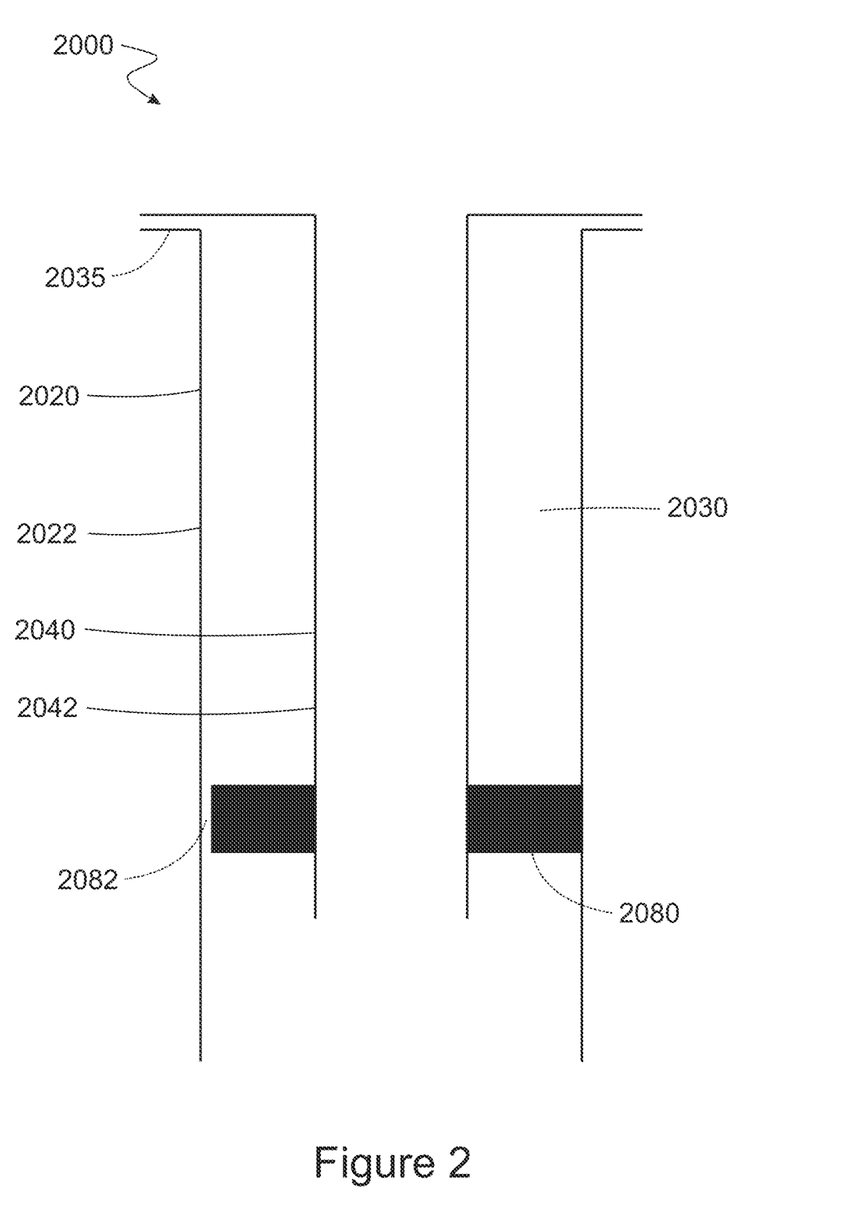
FIG. 2 is a schematic illustration of a system.

FIG. 2 schematically depicts a system 2000, which is part of a well, such as an oil well, a gas well or a water well. The system 2000, includes a production casing 2020 having an inner surface 2022 and a tubing 2040 having an outer surface 2042. The inner surface 2022 of the production casing 2020 and the outer surface 2042 of the tubing 2040 form a tubing-casing annulus 2030. A packer 2080 is disposed in the annulus 2030. A gap 2082 is present between the packer 2080 and the inner surface 2022 of the production casing 2020. The gap 2082 can allow an undesired fluid (e.g., oil, gas) to flow around the packer 2080 in the upward direction and/or an undesired fluid (e.g. packer fluid) to flow around the packer 2080 in the downward direction. A flange 2035 is disposed at the upper portion of the production casing 2020 and the tubing 2040. The flange 2035 is in fluid communication with the annulus 2030.

Figure 3:
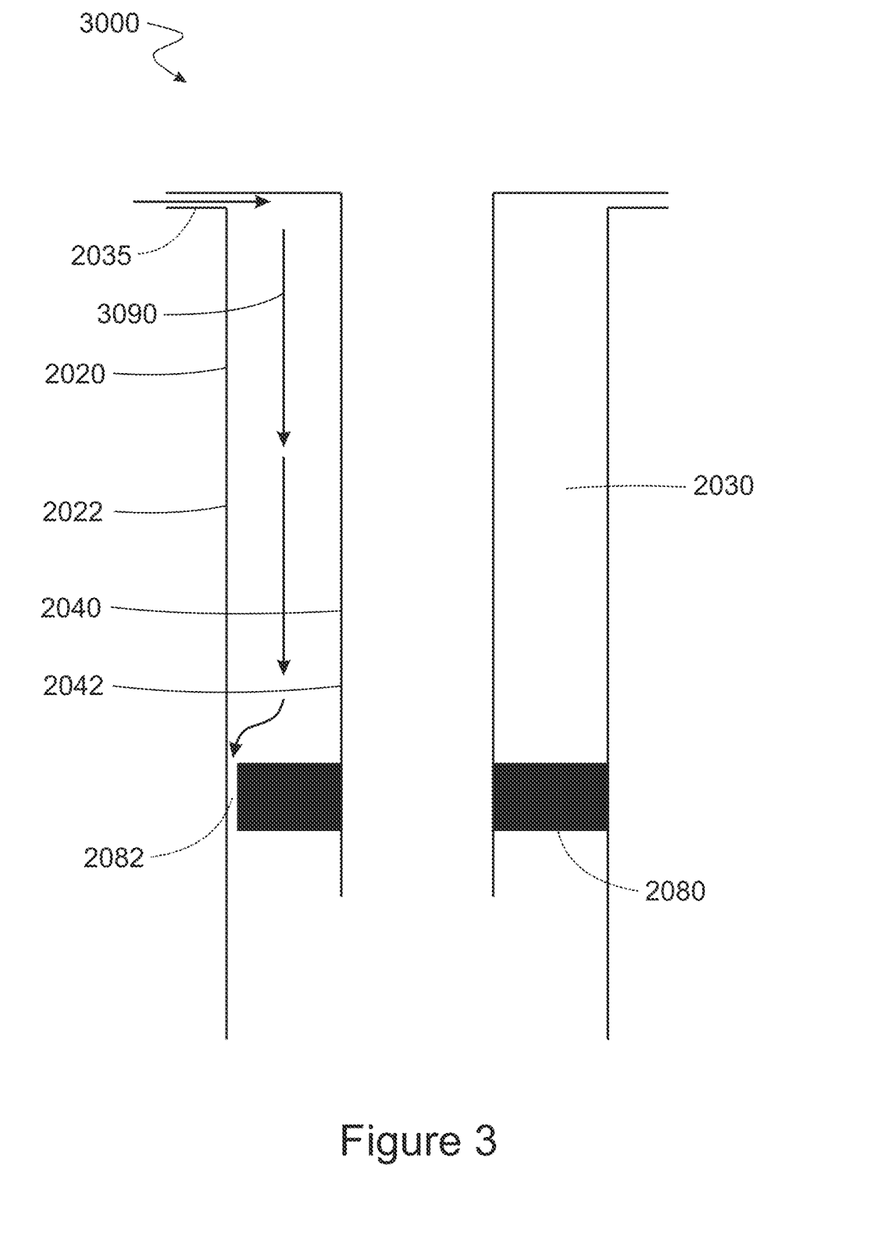
FIG. 3 is a schematic illustration of a system.

FIG. 3 schematically depicts a system 3000, in which a composition 3090 (discussed in more detail below) is introduced (e.g. pumped) through the flange 2035 and into the annulus 2030 to seal the gap 2082 between the packer 2080 and the inner surface 2022 of the production casing 2020. The flow of the composition 3090 is depicted by the arrows.

As the composition flows downward from the flange 2035 toward the packer 2080, colloidal silica gel precipitates out of the composition.

Figure 4:
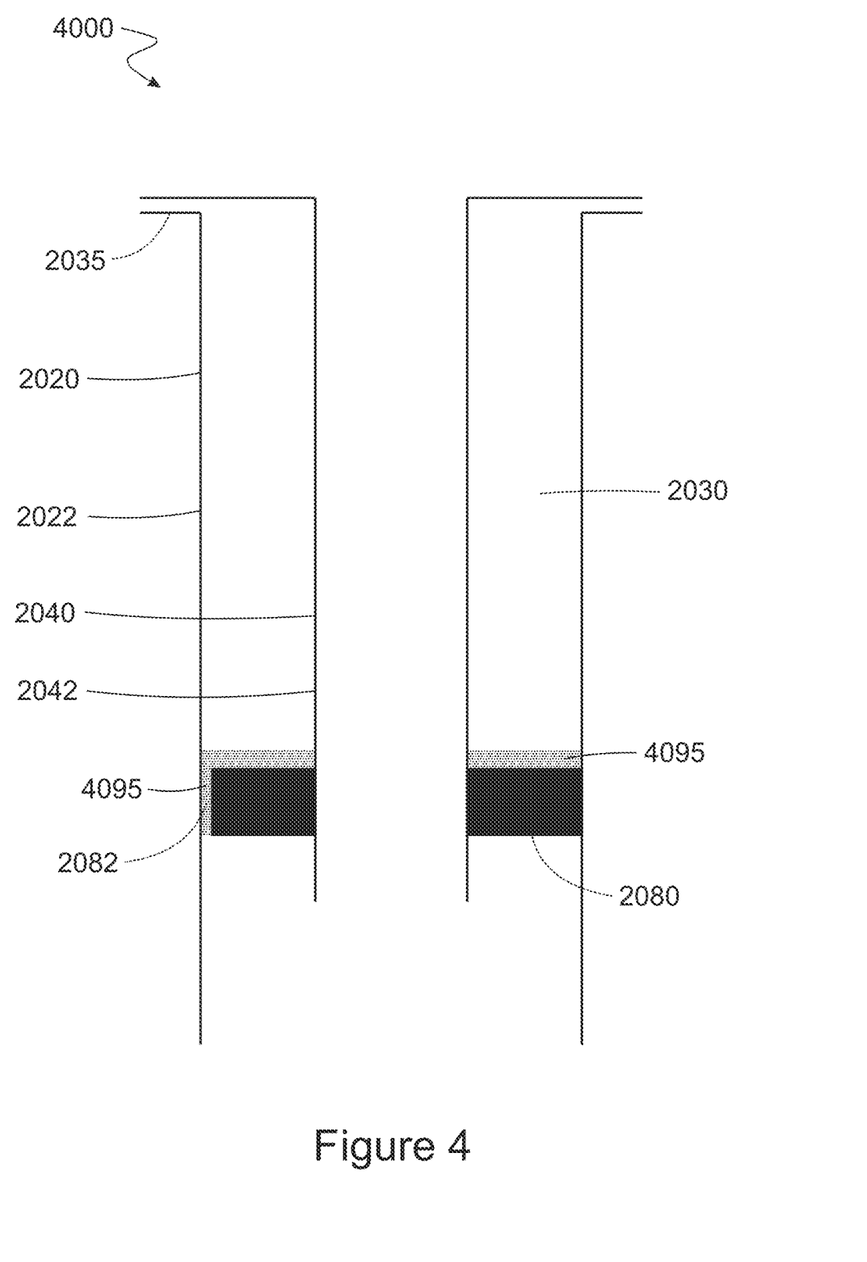
FIG. 4 is a schematic illustration of a system.

FIG. 4 schematically depicts a system 4000, in which the gap 2082 is sealed with a colloidal silica gel 4095 disposed on the top surface of the packer 2080 and in the gap 2082 between the packer 2080 and the inner surface 2022 of the production casing 2020.

Figure 5:
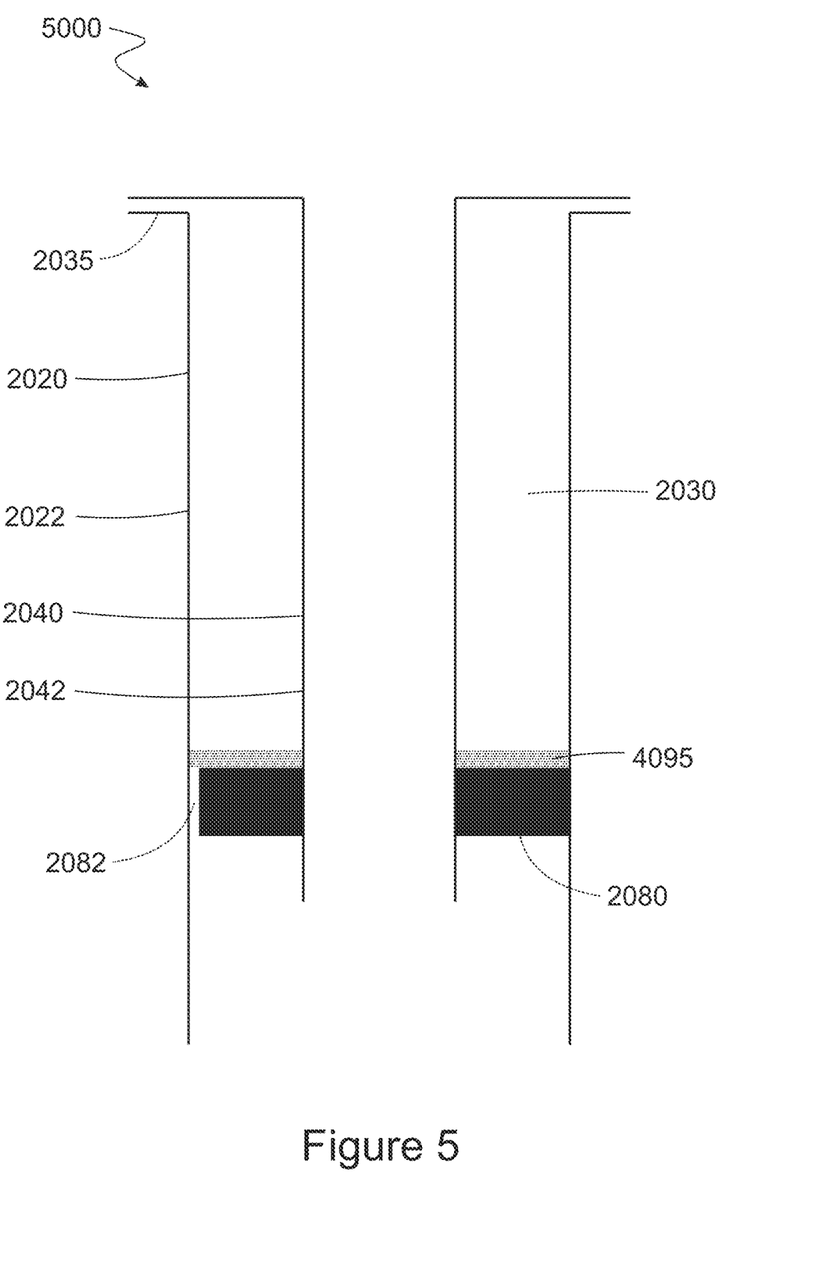
FIG. 5 is a schematic illustration of a system.

FIG. 5 schematically depicts a system 5000, in which the gap 2082 is sealed with a colloidal silica gel 4095 on the top surface of the packer 2080 and covering the gap 2082 between the packer 2080 and the inner surface 2022 of the production casing 2020. The colloidal silica gel 4095 is not disposed in the gap 2082 between the packer 2080 and the inner surface 2022 of the production casing 2020.

Figure 6:
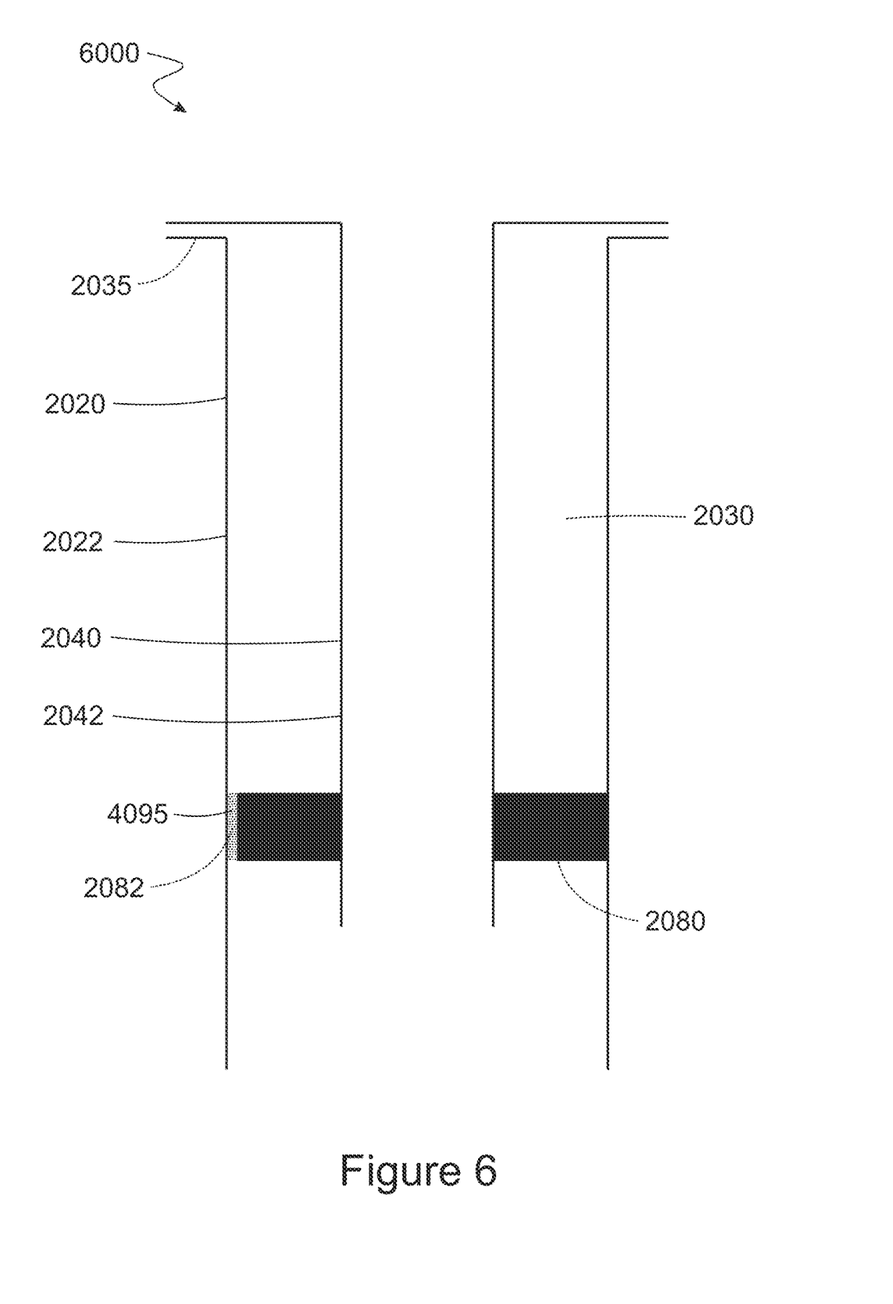
FIG. 6 is a schematic illustration of a system.

FIG. 6 schematically depicts a system 6000, in which the gap 2082 is sealed with a colloidal silica gel disposed in the gap 2082 between the packer 2080 and the inner surface 2022 of the production casing 2020. The colloidal silica gel 4095 is not disposed on the top surface of the packer 2080.

In some embodiments, the diameter of the inner surface 2022 of the production casing 2020 is at least 6 (e.g. at least 7, at least 8) inches and at most 10 (e.g. at most 9) inches.

In certain embodiments, the outer diameter 2042 of the tubing 2040 is at least 3 (e.g. at least 4, at least 5) inches and at most 7 (e.g. at most 6) inches.

In some embodiments, the volume of the tubing-casing annulus 2030 it at least 175 (e.g. 176, at least 180, at least 200, at least 220, at least 240, at least 260, at least 280, at least 300) barrels (bbl) and at most 365 (e.g. at most 360, at most 340, at most 320) bbl at a packer depth of 4473 feet (ft).

In certain embodiments, the packer depth is at least 3500 (e.g. at least 4000, at least 4400) feet and at most 5500 (e.g. at most 5000) feet. Generally, the cross-sectional area of the packer is determined by the casing inner diameter and tubing outer diameter.

In some embodiments, when the packer is not set, the fluid clearance for fluids to bypass the clearance is at least 0.2 inches and at most 0.4 inches.

In some embodiments, after the packer is set, a refilling volume of the packer fluid of at least 0.1 (e.g. at least 0.2, at least 0.3) bbl and at most 1 (e.g. at most 0.9, at most 0.8) bbl is used to gain positive pressure.

In certain embodiments, the colloidal silica gel is on an upper surface of the packer. In certain embodiments, the height of the colloidal silica gel is at least 1 (e.g. at least 2, at least 3, at least 5, at least 10) ft and at most 20 (e.g. at most 15, at most 10) ft above the upper surface of the packer.

In general, the colloidal silica gel has a density greater than that of water. In certain embodiments, the colloidal silica gel has a density of at least 1.13 (e.g. 1.14, 1.15, 1.3) g/ml and at most 2.5 g/ml.

In some embodiments, the composition (prior to precipitation of the colloidal silica gel) has a viscosity of at least 90 (e.g., at least 115, at least 150) centipoise (cP) and at most 165 (e.g., at most 160, at most 155). In some embodiments, after formation of the composition, the viscosity increases rapidly within minutes. This generally depends on the amount of activator used. In general, the viscosity of the colloidal silica gel is such that it cannot be measured.

In general, the colloidal silica gel has a gelation time such that it will not gel too fast and reach the packer as solid pieces unable to form a proper seal. Generally, the gelation time (time for the precipitated colloidal silica material to have a viscosity of 200 cP) depends on the amount of activator used in the composition. In certain embodiments, the colloidal silica gel has a gelation time of at least 4 (e.g., at least 5, at least 6) minutes (min) and at most 20 (e.g., at most 15 at most 10) minutes from the composition.

In general, the colloidal silica gel is formed by precipitation from a composition that includes colloidal silica, water and an activator. As used herein, an "activator" is a species that promotes precipitation of the colloidal silica out of the composition. Examples of activators include NaCl and 1,6-hexanediol-diglycidyl-ether (Razeen® D7109). In some embodiments, the composition further includes a corrosion inhibitor (e.g., O-3670R) and/or an oxygen scavenger (e.g., sodium sulfite ($Na_2SO_3$), OXYGON™ or FE-20). In general, the corrosion inhibitor and/or oxygen scavenger prevent the water of the composition and/or dissolved oxygen from causing corrosion.

Generally, the composition is prepared by combining the components with mixing if desired. In general, the composition is then relatively quickly (e.g., immediately) disposed in the tubing-casing annulus 2035. Typically, within a short time period (e.g., immediately), colloidal silica precipitates from the composition, resulting in formation of the colloidal silica gel and an aqueous layer on top of the colloidal silica gel.

In some embodiments, the composition contains at least 40 (e.g. at least 50, at least 60, at least 70, at least 80, at least 90) liters (L) of water and at most 100 (e.g. at most 90, at most 80, at most 70, at most 60, at most 50) L of water.

In certain embodiments, the composition contains at least 40 (e.g. at least 50, at least 60, at least 70, at least 80, at least 90) L of 20 weight percent (wt. %) colloidal silica solution and at most 100 (e.g. at most 90, at most 80, at most 70, at most 60, at most 50) L of 20 wt. % colloidal silica solution.

In some embodiments, the composition contains at least 1 (e.g. at least 2, at least 3, at least 4, at least 5, at least 6, at least 7, at least 8, at least 9) kilograms (kg) of NaCl and at most 10 (e.g. at most 9, at most 8, at most 7, at most 6, at most 5) kg of NaCl.

In certain embodiments, the composition contains at least 4 (e.g. at least 5, at least 6, at least 7, at least 8, at least 9) L of 1,6-hexanediol-diglycidyl-ether and at most 10 (e.g. at most 9, at most 8, at most 7, at most 6, at most 5) L 1,6-hexanediol-diglycidyl-ether.

In some embodiments, the composition contains at least 0.018 (e.g. at least 0.02, at least 0.03, at least 0.04) kg of oxygen scavenger and at most 0.045 (e.g. at most 0.04, at most 0.03, at most 0.02) kg of oxygen scavenger.

In certain embodiments, the composition contains at least 0.4 (e.g. at least 0.5, at least 0.6, at least 0.7, at least 0.8, at least 0.9) kg of corrosion inhibitor and at most 1 (e.g. at most 0.9, at most 0.8, at most 0.7, at most 0.6, at most 0.5) kg of corrosion inhibitor.

In some embodiments, the composition contains at least 6.5 (e.g., at least 10, at least 15) weight percent (wt. %) colloidal silica at most 32 (e.g., at most 25, at most 20) wt. % colloidal silica.

In certain embodiments, the composition contains at least 66 (e.g., at least 73, at least 78) wt. % water and at most 91.5 (e.g., at most 88, at most 83) wt. % water.

In some embodiments in which the activator is NaCl, the composition contains at least 0.2 (e.g., at least 0.5, at least 1, at least 2) wt. % NaCl and at most 4 (e.g., at most 3, at most 2) wt. % NaCl.

In certain embodiments in which the activator is 1,6-hexanediol-diglycidyl-ether, the composition contains at least 2.5 (e.g., at least 5, at least 7.5, at least 8) wt. % 1,6-hexanediol-diglycidyl-ether and at most 15 (e.g., at most 12.5, at most 10, at most 8) wt. % 1,6-hexanediol-diglycidyl-ether.

In some embodiments, the composition contains at least 0.04 (e.g., at least 0.07, at least 0.1) wt. % oxygen scavenger and at most 1 (e.g., at most 0.9, at most 0.8) wt. % oxygen scavenger.

In certain embodiments, the composition contains at least 1 (e.g., at least 5, at least 8, at least 10) wt. % corrosion inhibitor and at most 15 (e.g., at most 12) wt. % corrosion inhibitor.

In some embodiments, the composition is disposed in the tubing-casing annulus 2030 under pressure, e.g., by pumping the composition into the annulus 2030. In certain embodiments, the pressure is at least about 100 (e.g., at least 200, at least 300) pounds per square inch (psi) and at most about 1000 (e.g., at most 900, at most 800) psi.

In some embodiments, the colloidal silica gel contains only colloidal silica. However, in certain embodiments, the colloidal silica gel contains water, activator (e.g. NaCl or 1,6-hexanediol-diglycidyl-ether), oxygen scavenger and/or corrosion inhibitor. As an example, in some embodiments, the colloidal silica gel contains at least at least 6.5 (e.g., at least 10, at least 15) weight percent (wt. %) colloidal silica at most 32 (e.g., at most 25, at most 20) wt. % colloidal silica. As another example, in certain embodiments, the colloidal silica gel contains at least 66 (e.g., at least 73, at least 78) wt. % water and at most 91.5 (e.g., at most 88, at most 83) wt. % water. As a further example, in some embodiments, the colloidal silica gel contains at least 0.2 (e.g., at least 0.5, at least 1, a least 2) wt. % NaCl and at most 4 (e.g., at most 3, at most 2) wt. % NaCl. As an additional example, in certain embodiments, the colloidal silica gel contains at least 2.5 (e.g., at least 5, at least 7.5, at least 8) wt. % 1,6-hexanediol-diglycidyl-ether and at most 15 (e.g., at most 12.5, at most 10, at most 8) wt. % 1,6-hexanediol-diglycidyl-ether. As another example, in some embodiments, the colloidal silica gel contains at least 0.03 (e.g., at least 0.07, at least 0.1) wt. % oxygen scavenger and at most 1 (e.g., at most 0.9, at most 0.8) wt. % oxygen scavenger. As a further example, in certain embodiments, the colloidal silica gel contains at least 0.1 (e.g., at least 0.5, at least 1) wt. % corrosion inhibitor and at most 2 (e.g., at most 1.5) wt. % corrosion inhibitor.

In some embodiments, the colloidal silica gel silica gel is free from species that were not present in the composition from which the colloidal silica precipitated. As an example, in some embodiments, the colloidal silica gel is free of cement and/or non-aqueous-based fluid(s).

EXAMPLES

Forming a Colloidal Silica Gel

Figure 7:
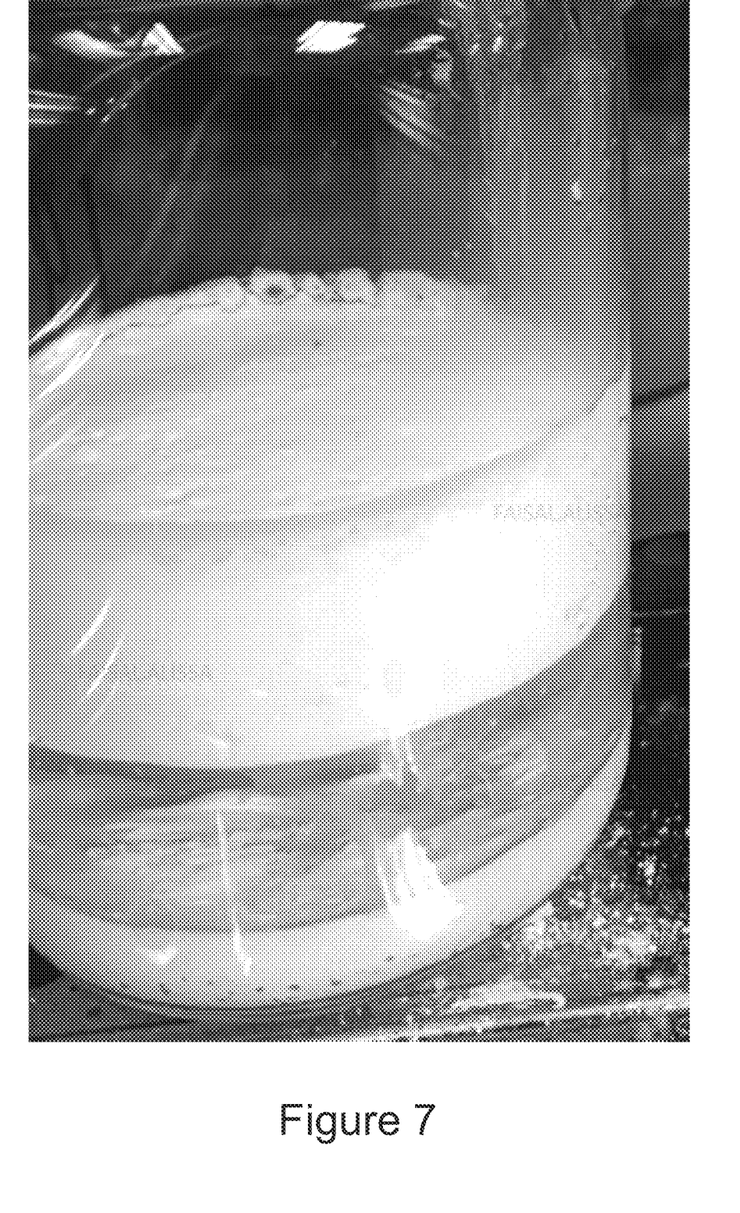
FIG. 7 is a photograph of a colloidal silica gel covered by an aqueous phase, which is in turn covered by a low-density gel.

A composition that contained water, 20 wt. % CB17 (40 wt. % colloidal silica, AkzoNobel), and 2 wt. % NaCl was prepared in a container, and the colloidal silica gel was allowed to precipitate at room temperature for 2 minutes. FIG. 7 is a photograph of the colloidal silica gel that precipitated. From top to bottom, the three layers shown in FIG. 7 were a low-density gel (EXPANCEL WE40), an aqueous layer (2% NaCl brine) and the colloidal silica gel. The low-density gel was added to aid visualization of the aqueous layer.

Sample Calculations

A sample calculation was performed to determine the quantities of the constituents of Composition 1 for covering 10 feet (ft) above the packer with Composition 1. Table 1 lists the physical dimensions of the system. The production casing had an outer diameter of 9⅝ inches an in inner diameter ("Casing ID") of 8.835 inches. The outer surface of the tubing had an outer diameter ("Tubing OD") of 5½ inches. The packer depth was 4473 feet. The safety factor of 1.5 was used to account for certain items, such as dead volumes (e.g. mixing tank volumes, injection line volumes). The conversion factor from square inch to bbl/ft was 1029.4.

The colloidal silica gel formed by precipitation would cover only a portion of the space initially occupied by the composition. If the composition covered 10 feet, the precipitated colloidal silica layer would cover 2-3 feet above the top of the packer. The dimensions of the wellhead component(s) were not factored into the calculation. The relevant equations are shown below. The results are present in table 2.

TABLE 1

| Casing/Tubing | Casing ID (in) | Tubing OD (in) | TCA Volume Capacity (bbl/ft) | Casing Weight (lb/ft) | Bore Packer depth (ft) | TCA Volume (bbl) | TCA Volume × 1.5 (bbl) |
|---|---|---|---|---|---|---|---|
| 9-⅝ × 5 ½ | 8.835 | 5-1/2 | 0.046441835 | 40 | 4473 | 208 | 312 |

$$TCA \text{ Volume Capacity} = \frac{\text{Casing } ID^2 - \text{Tubing } OD^2}{1029.4}$$

$$TCA \text{ Volume} = \text{Bore Packer Depth} * TCA \text{ Volume Capacity} * Safty \text{ factor}$$

$$\text{To Cover 10 ft of the } TCA = \frac{10 \text{ ft} * 312 \text{ bbl}}{4473 \text{ ft}} = 0.70 \text{ bbl}$$

$$0.7 \text{ bbl} * \frac{159 \text{ L}}{1 \text{ bbl}} = 111.3 \text{ L}$$

$$\text{Water volume} = \frac{111.3 \text{ L}}{2} = 55.65 \text{ L}$$

$$\text{NaCl (mass)} = *55.65 * 0.02 = 1.113 \text{ kg}$$

A corresponding sample calculation was performed to determine the quantities of the constituents of Composition 2 for covering 10 feet (ft) above the packer with Composition 2. The inner surface of the production casing had a diameter of 8.835 inches. The outer surface of the tubing had a diameter of 5.5 inches. The packer depth was 4473 feet. The colloidal silica gel formed by precipitation would cover only a portion of the space initially occupied by the composition. If the composition covered 10 feet, the precipitated colloidal silica layer would cover 2-3 feet above the bottom of the well cellar. The dimensions of the wellhead component(s) were not factored into the calculation. The relevant equations are shown below. The results are present in table 2.

TABLE 2

|  | Water | CB17 | NaCl | 1,6-Hexanediol-diglycidyl-ether |
|---|---|---|---|---|
| Composition 1 | 55.65 L | 55.65 L | 1.113 kg | — |
| Composition 2 | 53 L | 53 L | — | 5.3 L |

Viscosity Measurements

Figure 8:
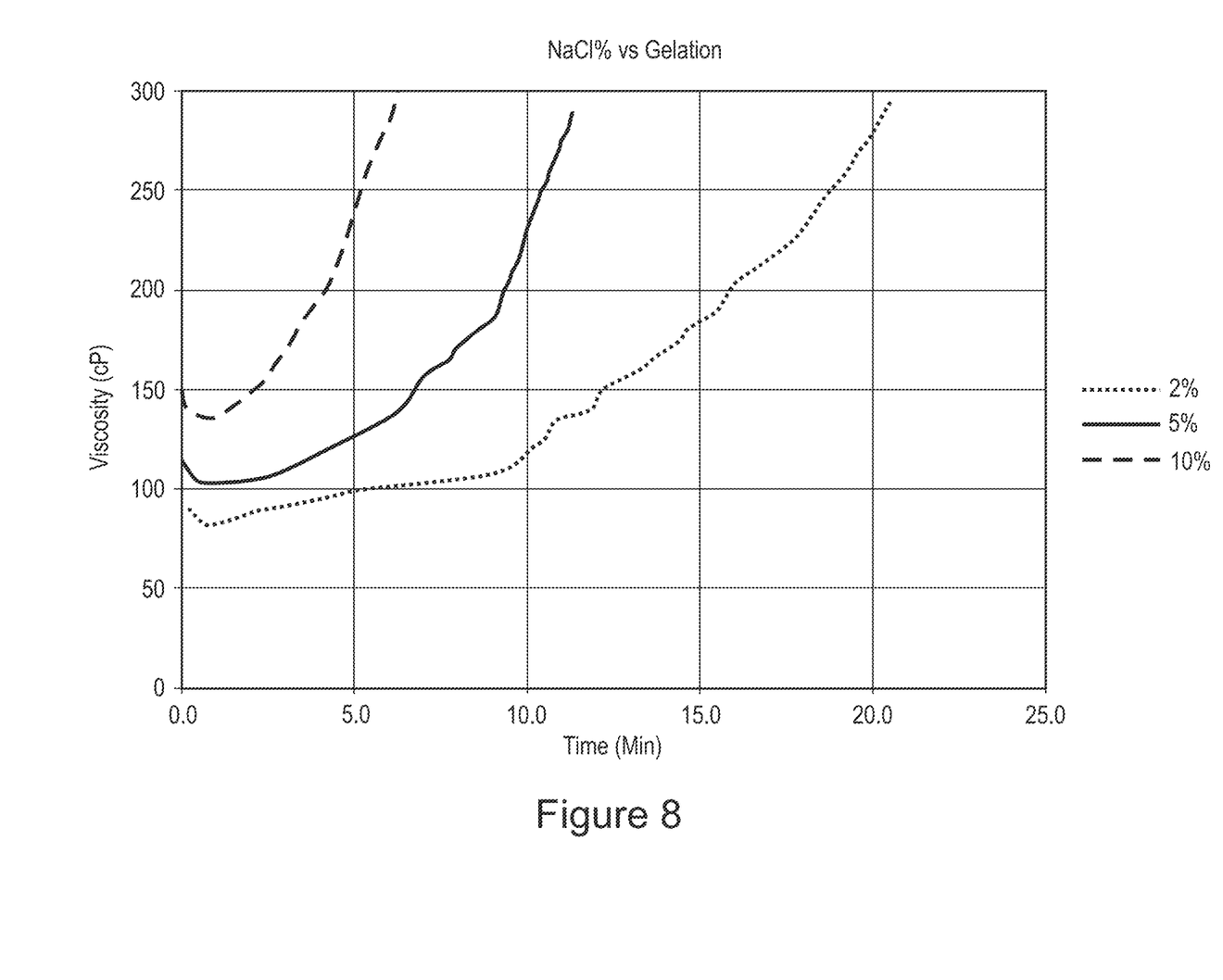
FIG. 8 is a graph of experimental data.

The change in viscosity as a function of time was measured for a solutions containing 11.3 wt. % colloidal silica and 2, 5 or 10 wt. % NaCl. The viscosity was measured by a Fann 35 viscometer at 300 rpm. The results are presented in FIG. 8.

Compatibility with Tubing-Casing Annulus Fluids A pre-weighed carbon steel coupon (2.325 g, 0.5 inch width, 3 inch length, and 1/16 inch thickness) was immersed in a beaker containing 25 mL water, and 2.5 g Sodium Sulfite (oxygen scavenger). 25 mL of water containing 11.3 wt. % colloidal silica and 2 wt. % NaCl was added to the beaker. After seven days, the coupon was removed from the beaker, and the colloidal silica gel was removed from the coupon. The coupon was weighed and no change in the mass of the coupon was observed, indicating that the colloidal silica gel did not cause any corrosion of the coupon.

OTHER EMBODIMENTS

While certain embodiments have been disclosed, the disclosure is not limited to such embodiments.

For example, while certain embodiments of providing a colloidal silica gel have been disclosed, the disclosure is not limited to such embodiments. As an example, in some embodiments, a liquid containing colloidal silica is introduced into the tubing-casing annulus by injecting and pressurizing the liquid, followed by bleeding off the tubing-casing annulus and, after a period of time (e.g., 20 minutes), re-pressurizing with a fluid containing an activator. As another example, in certain embodiments, if the tubing-casing annulus is not filled and the packer is not leaking, the entire composition (e.g., Composition 1 or Composition 2) can be prepared and injected into the tubing-casing annulus immediately prior to gelling.

What is claimed is:

1. A system, comprising:
a casing comprising an inner surface;
a tubing within the casing, the tubing comprising an outer surface and an inner space, the casing inner surface and the tubing outer surface defining an annular space;
a packer within the annular space; and
a colloidal silica gel which seals a gap selected from the group consisting of a gap between the inner surface of the casing and a surface of the packer, a gap between the outer surface of the tubing and a surface of the packer, and a gap extending through the packer, and combinations thereof.

2. The system of claim 1, wherein the casing is a production casing.

3. The system of claim 1, wherein the gap is a gap between the inner surface of the casing and a surface of the packer.

4. The system of claim 1, wherein the colloidal silica gel is on an upper surface of the packer.

5. The system of claim 4, wherein the colloidal silica gel extends at least two feet above the upper surface of the packer.

6. The system of claim 1, wherein the colloidal silica gel prevents a fluid in the annular space from flowing between a region above the packer and a region below the packer.

7. The system of claim 1, wherein the casing, the tubing and the packer are underground components of a well.

8. The system of claim 7, wherein:
the casing is a production casing;
the gap is a gap between the inner surface of the casing and a surface of the packer; and
the colloidal silica gel is on an upper surface of the packer.

9. The system of claim 1, wherein the colloidal silica gel comprises at least 6.5 wt. % of colloidal silica.

10. A well, comprising:
a production casing comprising an inner surface;
a tubing within the production casing, the tubing comprising an outer surface and an inner space, the production casing inner surface and the tubing outer surface defining an annular space;
a packer within the annular space; and
a colloidal silica gel sealing a gap selected from the group consisting of a gap between the inner surface of the production casing and a surface of the packer, a gap between the outer surface of the tubing and a surface of the packer, a gap extending through the packer, and combinations thereof,
wherein the well comprises a member selected from the group consisting of an oil well, a gas well and a water well.

11. The well of claim 10, wherein the gap is a gap between the inner surface of the casing and a surface of the packer.

12. The well of claim 10, wherein the colloidal silica gel is on an upper surface of the packer.

13. The well of claim 12, wherein the colloidal silica gel extends at least two feet above the upper surface of the packer.

14. A method of sealing a leak in or near a packer present in an annular space between a production casing inner surface and a tubing outer surface, the method comprising:
disposing a composition within the annular space, the composition comprising colloidal silica, water, and an activator; and
allowing colloidal silica to precipitate from the composition to provide a colloidal silica gel within the annular space, wherein
the colloidal silica seals a gap selected from the group consisting of a gap between the inner surface of the production casing and a surface of the packer, a gap between the outer surface of the tubing and a surface of the packer, a gap extending through the packer, and combinations thereof.

15. The method of claim 14, wherein disposing the composition within the annular space comprises pumping the composition into the annular space.

16. The method of claim 14, wherein the colloidal silica gel has a gelation time of at least 4 minutes and at most 20 minutes.

17. The method of claim 14, wherein the colloidal silica gel has density that is greater than a density of water.

18. The method of claim 14, wherein the composition comprises:
from 66 wt. % to 91.5 wt. % water;
from 6.5 wt. % to 32 wt. % colloidal silica; and
from 0.2 wt. % to 4 wt. % NaCl.

19. The method of claim 14, wherein the composition comprises:
from 66 wt. % to 91 wt. % water;
from 6.5 wt. % to 31.5 wt. % colloidal silica; and from 2.5 wt. % to 15 wt. %1,6-hexanediol-diglycidyl-ether.

20. The method of claim 14, wherein the colloidal silica gel occupies a volume of at least 1 ft$^3$.

\* \* \* \* \*

UNITED STATES PATENT AND TRADEMARK OFFICE
CERTIFICATE OF CORRECTION

| | |
|---|---|
| PATENT NO. | : 11,680,201 B1 |
| APPLICATION NO. | : 17/710011 |
| DATED | : June 20, 2023 |
| INVENTOR(S) | : Faisal Alissa et al. |

It is certified that error appears in the above-identified patent and that said Letters Patent is hereby corrected as shown below:

In the Claims

In Column 11, Line 1, Claim 19, please replace "15 wt. %1,6-" with -- 15 wt. % 1,6- --.

Signed and Sealed this
Fifth Day of November, 2024

Katherine Kelly Vidal
*Director of the United States Patent and Trademark Office*